US008073294B2

(12) United States Patent
Huffman et al.

(10) Patent No.: US 8,073,294 B2
(45) Date of Patent: Dec. 6, 2011

(54) REMOTE OPTICAL FIBER SURVEILLANCE SYSTEM AND METHOD

(75) Inventors: John Sinclair Huffman, Conyers, GA (US); Gerald Frank Laszakovits, San Antonio, TX (US); James Kirkpatrick, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 401 days.

(21) Appl. No.: 12/344,979

(22) Filed: Dec. 29, 2008

(65) Prior Publication Data

US 2010/0166357 A1 Jul. 1, 2010

(51) Int. Cl.
*G02B 6/00* (2006.01)
*G01N 21/00* (2006.01)
*G08B 13/00* (2006.01)
*H04B 1/06* (2006.01)

(52) U.S. Cl. ............... 385/12; 385/13; 385/88; 385/89; 385/92; 356/73.1; 340/541; 367/135; 367/136

(58) Field of Classification Search .................. 385/12, 385/13, 123, 88, 89, 92, 94; 340/565, 541, 340/552, 506, 517, 521, 522, 555, 556, 564, 340/567, 578; 348/152, 154, 61, 143; 250/216, 250/221; 367/136, 135; 356/73.1
See application file for complete search history.

(56) References Cited

U.S. PATENT DOCUMENTS

| 4,477,725 | A | 10/1984 | Asawa et al. ............ 250/231 R |
| 5,194,847 | A | 3/1993 | Taylor et al. ................. 340/557 |
| 5,778,114 | A | 7/1998 | Eslambolchi et al. .......... 385/12 |
| 6,449,400 | B1 | 9/2002 | Watanabe et al. ............... 385/12 |
| 6,529,620 | B2 * | 3/2003 | Thompson .................... 382/141 |
| 7,136,156 | B1 | 11/2006 | Quint .......................... 356/73.1 |
| 7,189,958 | B2 * | 3/2007 | Spillman et al. ......... 250/227.14 |
| 7,377,224 | B2 * | 5/2008 | Ryan et al. .................... 114/244 |
| 7,420,475 | B2 * | 9/2008 | Adnan et al. ................ 340/853.3 |
| 2004/0257218 | A1 * | 12/2004 | Shibata et al. ................ 340/522 |
| 2005/0022581 | A1 * | 2/2005 | Sunshine ...................... 73/31.05 |
| 2006/0261959 | A1 * | 11/2006 | Worthy et al. ............. 340/572.8 |
| 2007/0024464 | A1 * | 2/2007 | Lemenager et al. ........ 340/853.1 |
| 2008/0088846 | A1 | 4/2008 | Hayward et al. .............. 356/446 |
| 2008/0144016 | A1 | 6/2008 | Lewis et al. ................. 356/73.1 |
| 2010/0166357 | A1 * | 7/2010 | Huffman et al. ................ 385/12 |

OTHER PUBLICATIONS

U.S. Appl. No. 12/343,880, filed Dec. 24, 2008.

* cited by examiner

*Primary Examiner* — Brian Healy

(57) ABSTRACT

In accordance with one aspect of the disclosed technology, wireless communications are used in a fiber surveillance system to enable monitoring of remote locations for vibrations, acoustic signals, stresses, stress fatigue or other detectable characteristics. A fiber that is deployed in the structure or region being monitored is connected a wireless transmitter that is used to transmit, to a receiving system, return optical signals obtained with the surveillance system. The return signals can be transmitted in raw form or after partial or total analysis.

20 Claims, 8 Drawing Sheets

REMOTE OPTICAL FIBER SURVEILLANCE SYSTEM AND METHOD

FIELD

The disclosed technology relates generally to optical fiber surveillance systems and methods.

BACKGROUND

U.S. Pat. No. 5,194,847 discloses "an apparatus for sensing intrusion into a predefined perimeter comprising means for producing a coherent pulsed light, which is injected into an optical sensing fiber having a first predetermined length and positioned along the predefined perimeter. A backscattered light in response to receiving the coherent light pulses is produced and coupled into an optical receiving fiber. The backscattered light is detected by a photodetector and a signal indicative of the backscattered light is produced. An intrusion is detectable from the produced signal as indicated by a change in the backscattered light. To increase the sensitivity of the apparatus, a reference fiber and an interferometer may also be employed."

U.S. Pat. No. 5,778,114 discloses a fiber analysis system that "detects threats to a buried underground fiber by delivering two optical sub-signals, split from a single beam, into opposite ends of the fiber so the sub-signals traverse the fiber in opposite directions. The sub-signals are recombined into a beam whose characteristics are detected by a detector. The output signal of the detector is compared by a processor to different reference values stored in a data base representing different detector output signals corresponding to different fiber conditions. By matching the detector output signal to a reference value associated with a particular fiber condition, the processor can determine whether a potential threat exists. By inducing a sequence of known vibrations (tones) inn the fiber at spaced locations along a generally orthogonal to the fiber, the processor can establish the location of the fiber by comparing the detector output signal to a reference signals corresponding to the known tones to determine which one was received in the shortest time."

U.S. patent application Publication 20080088846 discloses an improved technique for acoustic sensing that involves, in one embodiment, "launching into a medium, a plurality of groups of pulse-modulated electromagnetic-waves. The frequency of electromagnetic waves in a pulse within a group differs from the frequency of the electromagnetic waves in another pulse within the group. The energy scattered by the medium is detected and, in one embodiment, may be used to determine a characteristic of the environment of the medium. For example, if the medium is a buried optical fiber into which light pulses have been launched in accordance with the invention, the presence of acoustic waves within the region of the buried fiber can be detected."

U.S. patent application Publication 20080144016 discloses an improved technique for acoustic sensing that in one embodiment, involves "launching into a medium, a plurality of groups of pulse-modulated electromagnetic-waves. The frequency of electromagnetic waves in a pulse within a group differs from the frequency of the electromagnetic waves in another pulse within the group. The energy scattered by the medium is detected and, in one embodiment, the beat signal may be used to determine a characteristic of the environment of the medium. For example, if the medium is a buried optical fiber into which light pulses have been launched in accordance with the invention, the presence of acoustic waves within the region of the buried fiber can be detected."

U.S. Pat. No. 4,477,725 discloses a system for remote measurement of structural forces that "includes a plurality of microbend transducers mounted along the length of the structure for microbending an optical fiber in response to structural forces, such as stress acting upon an oil or gas pipeline or the like. An optical time domain reflectometer (OTDR) has a light source for launching a pulsed optical signal for passage through the fiber and a photodetector for sensing as a function of time the intensity of backscattered light reflected back through the fiber, wherein this sensed time function is correlated directly with discrete longitudinal positions along the length of the fiber and the structure. When one or more of the microbend transducers is activated to induce a microbend in the fiber in response to localized forces acting upon the structure, a portion of the backscattered light is lost at the microbend. This attenuation in backscattered light intensity is sensed quantitatively and positionally identified by the photodetector."

U.S. Pat. No. 6,449,400 discloses that "a sensing optical fiber can detect information with a high detection sensitivity by an OTDR method using Rayleigh scattered light. For this purpose, the sensing optical fiber includes a main line element which is an optical fiber installed as a light transmission line and sensor elements which are relatively short optical fibers that are inserted in intermediate parts of the main line element and whose core diameters are different from that of the main line element. The sensor system is capable of detecting various types of information obtained simultaneously with a high detection sensitivity by an OTDR method using Rayleigh scattered light. For this purpose, a sensor system includes sensing optical fibers and a measuring instrument which detects information around the light transmission line, in which the sensing optical fibers are provided, by using backscattered light of the sensing optical fibers. In the sensor system, a plurality of the sensing optical fibers are provided, and the sensing optical fibers have a different number of the sensor elements, different distances between the sensor elements and different sensor element core diameters. Also, an optical switch, by which the sensing optical fibers are selectively switched, is provided between the sensing optical fibers and the measuring instrument." The system "can be applied for the following purposes (1) Detection of distortion, fatigue, rupture or the like in structures such as general buildings, high-rise buildings, speedways, elevated bridges, tunnels, dams, flying fields, harbor facilities, and industrial facilities. (2) Detection of distortion, fatigue, rupture or the like in moving structures such as frames of airplanes, ship hulls, frames of motorcars, frames of railroad vehicles, and spacecraft bodies. (3) Detection of distortion, fatigue, rupture or the like in general building materials such as steel frames, wallplates, flooring, ceiling panels, and connecting fittings. (4) Detection of distortion, fatigue, rupture or the like in life-lines such as oil pipelines, oil storage tanks, gas pipelines, gas tanks, water pipelines, electric cables, and (maritime or underseas) communication cables. (5) Supervision for guarding against intruders into or protecting the environment of buildings, parks, and outside facilities. (6) Supervision of diastrophism and ground subsidence (for earthquake prediction). (7) Supervision or observation of living bodies. (8) Detection of liquid adhesion."

U.S. Pat. No. 7,136,156 discloses "a method, system, and medium . . . for Optical Time Domain Reflectometer (OTDR) Data storage and retrieval in a networking environment. The method includes receiving an OTDR trace file in its native format that includes OTDR information, storing the trace file, receiving a request to present the OTDR information in a browser or some other interface, identifying a viewer that can render the OTDR information, and communicating the OTDR information to the browser. The system includes a user interface that facilitates uploading an OTDR trace file in its native format, a storage device for receiving the trace file, and a viewer that can render the data within the OTDR trace file."

SUMMARY

In accordance with one aspect of the disclosed technology, wireless communications are used in a fiber surveillance system to enable monitoring of remote locations for vibrations, acoustic signals, stresses, stress fatigue or other detectable characteristics. A fiber that is deployed in the structure or region being monitored is connected to a wireless transmitter that is used to transmit, to a receiving system, return optical signals obtained with the surveillance system. The return signals can be transmitted in raw form or after partial or total analysis.

In one embodiment of the invention, multiple fiber surveillance systems, each comprising one or more fibers with detector and transmission instrumentalities, may be deployed, for example by being dropped from the air, in the proximity of a "target" that needs to be monitored. The systems may be deployed through the use of drones or manned vehicles, and once in place can be operated individually or as a network to transmit signals wirelessly to a monitoring location remote from the deployed systems. In this way, danger to monitoring personnel may be minimized, especially as compared to co-locating the monitoring personnel with the surveillance fibers.

In an alternative embodiment of the disclosed technology at least one optical fiber with associated instrumentalities appropriate for a specific fiber surveillance technology such as, for example, Raleigh scattering or ODTR, is disposed in an exemplary vehicular structure, such as, for example, a plane, ship, ground vehicle or submarine. The fiber surveillance system monitors acoustic signals associated with normal usage of the vehicle or with abnormal events or stresses associated with vehicle usage. Return optical signals from the surveillance system that reflect the acoustic disturbance, are sent wirelessly to a receiver. The signals can be sent as raw data and be analyzed at the receiver end of the system, or all, or a portion, of the signal analysis can be performed at the transmitter end of the system.

In any application of the disclosed technology the return signal, usually after analysis, may be compared with historical return signals from the monitored structure, or with other stored data, to determine abnormalities. Upon detection of such abnormalities, alerts may be sent to the operators of the vehicle or to other personnel monitoring a given environment.

The surveillance methodology of the disclosed technology may be operated and monitored continuously or may be collected and transmitted wirelessly to a receiving station at periodic or irregular intervals, for example, only when the transmitter is within range of the receiving station. This "sometimes on" embodiment may be particularly useful for vehicles such as airplanes that, during their travels, range over large distances from the receiving station.

Fibers that are used to detect the vibrations, acoustic signals or other disturbances can be arrayed in a single dimensional or two-dimensional topology. In one embodiment of the disclosed technology, the fiber is arranged in a two dimensional topology to improve the spatial resolution of the system. With such a topology the spatial monitoring resolution of the surveillance system is significantly improved as compared to systems in which the fiber is deployed in an essentially straight line, on dimensional topology. In one embodiment, sections of the fiber are oriented relative to each other at angles of approximately ninety degrees to produce a grid-like topology. In a further embodiment of the disclosed technology, two or more such oriented fibers are juxtaposed or overlapped to yield even greater resolution.

If the fiber is deployed in a two dimensional topology, the exact topology of the fiber must be known to determine the geographic location of a disturbance based on a given distance along the fiber, since such distance is often the only location information relating to the disturbance that is obtained from the fiber. In such circumstances, a signal such as a vibration or other acoustic signal may be imposed at one or more known locations along the fiber to relate distance along the fiber to a specific geographic location.

Finally, a database of signatures associated with known conditions and/or disturbances and/or the historical behavior of signatures from a given structure or environment may be compared to a detected signal to further analyze the detected signal and obtain more detailed information about the relationship between the detected signal and the condition of the structure or the environment in which the disturbance is located.

DETAILED DESCRIPTION

This detailed description will start with a general discussion of the disclosed topology. This discussion will be in the context of one ground application of that technology and one vehicular application of that technology. Following that discussion, various other applications of the disclosed technology will be discussed. After that discussion, an ODTR technology that may be used with the disclosed technology will be discussed. However, it will be understood by persons having ordinary skill in this art that any optical signal analysis technique useful in optical surveillance systems may be used with the disclosed technology.

The Disclosed Technology

Figure 1:
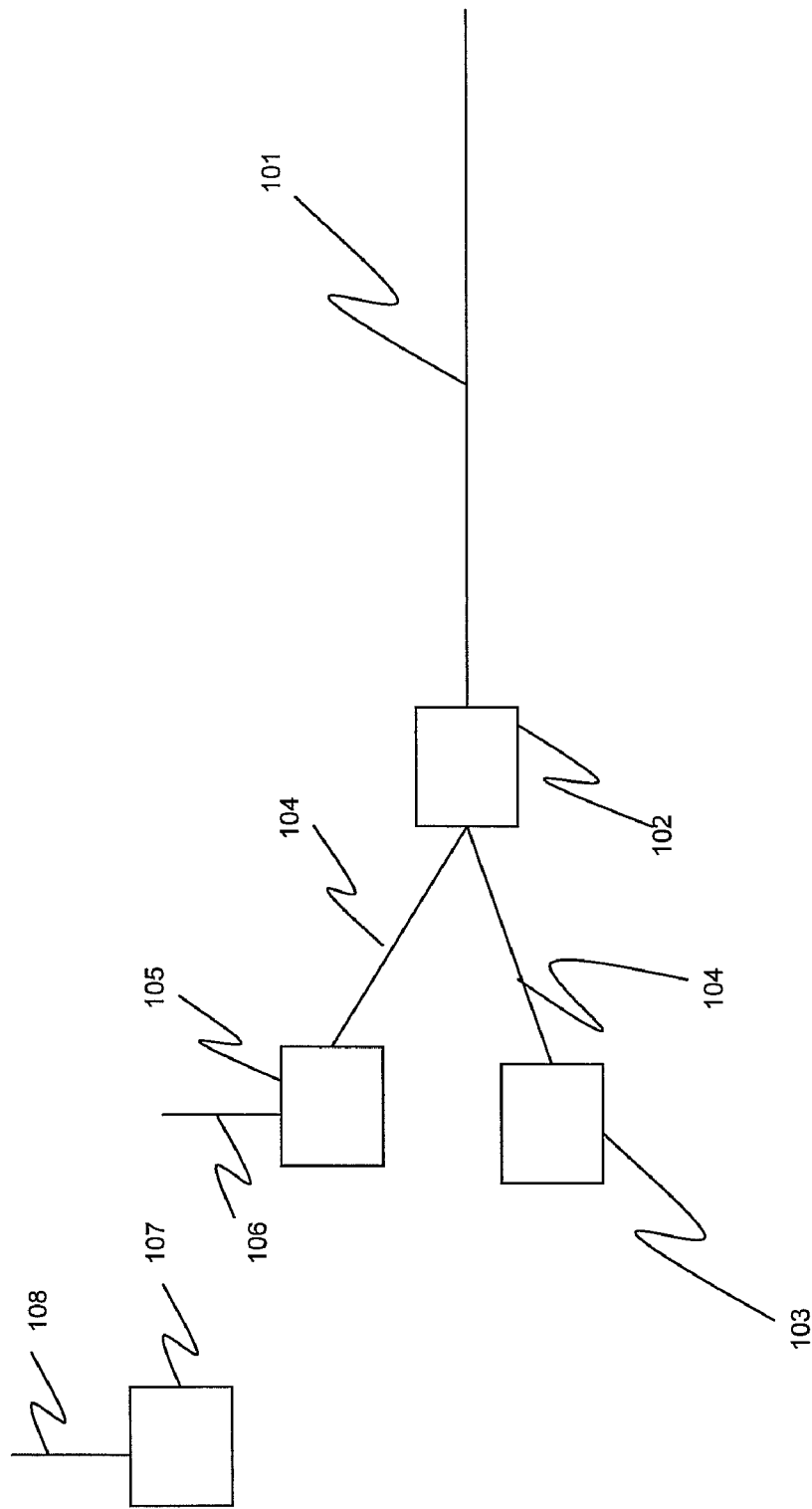
FIG. 1 is a schematic representation of an embodiment of the disclosed technology.

FIG. 1 is a schematic representation of a remote fiber surveillance configuration in accordance with one aspect of the disclosed technology. In this FIGURE, 101 is an optical fiber and 103 is a source of optical energy that is injected into the fiber. As will be understood by persons having ordinary skill in the art, the source of optical energy can be, for example, a laser. 105 is a detector to detect the return signal, sometimes referred to as the "backscattered signal", emitted from the fiber in accordance with the particular technology used by the surveillance system, such as Raleigh scattering or OTDR technology. As will be understood by persons having ordinary skill in the art, the detector of optical energy can be, for example, a semiconductor photo-detector. 105 can also include the necessary electronics, such as a digital signal processor, for analyzing the return signal to determine, for example, characteristics of an exemplary acoustic signal impinging upon the fiber at some point along its length. It will be understood that the impinging signal need not be limited to acoustic signals, but can be any type of signal that will affect the return optical signal in a way that can be analyzed to determine characteristics of the impinging signal. 102 is a splitter and/or combiner for used in injecting the optical energy into the fiber and removing the return signal from the fiber. 104 are appropriate fiber segments for bringing the injected and return signals to 103 and 105 respectively. However, the source and detector can be directly connected to the splitter/combiner. It will be understood by persons having ordinary skill in the art that the source of the injected optical signal and the analysis instrumentalities may be included in a single structure.

In one aspect of the disclosed technology 106 is a wireless transmitter including an appropriate antenna that transmits a signal to a wireless receiver 107 with appropriate antenna 108. It will be understood by persons have ordinary skill in the art that the antennae of 107 and 108, as well as the transmitter and receiver can be of any appropriate configuration and technology for transmitting and receiving wireless signals respectively. The wireless transmitter, receiver and antennae can involve any over-the-air transmission technology. It will be further understood that the analysis instrumentalities can be included in either 105 and/or 107 and that either or both can be connected to appropriate storage media to save data prior to or after processing. The wireless transmissions can occur continuously to provide continuous monitoring or, in a "sometimes-on" embodiment, can occur periodically or at selected times A Surface Embodiment The embodiment of FIG. 1 may be located on or below the ground and solar or battery power sources may be used to power the various instrumentalities shown. The embodiment may be deployed on or below the ground by ground-based equipment or may be dropped by air. Such deployment by air may involve simply dropping the equipment, or may involve the use of "smart" guidance technology. For example, a drone, carrying the appropriate fiber and associated instrumentalities, may be deployed from the ground or from the air. The drone may be guided wirelessly, or may be deployed by a plane with a trailing optical fiber or electrical wire that is used to communicate with the drone and perhaps provide visual feedback of the deployment process. In either event, the drone can be accurately guided by GPS based equipment to accurately deploy the wireless optical fiber surveillance apparatus.

In an alternative embodiment of the disclosed technology, multiple fibers such as that in FIG. 1 are deployed, each with their own instrumentalities as in FIG. 1. The instrumentalities can include networking devices that enable the various fibers to form a wireless network so that they can interact with each other to more effectively monitor the environment where they are located. Additional instrumentalities can include image equipment such as cameras to aid in the monitoring function. Where appropriate, the further instrumentalities can include equipment appropriate for self destruction, either upon a command received from a remote control location, or upon a command from the deployed fiber apparatus, for example, in response to the occurrence of a pre-determined event.

While this embodiment has been discussed in terms of ground deployment, it will be understood that underwater deployment can also be effected by, for example, locating the wireless transmitter of FIG. 1 on or above the surface of a body of water. The transmitter, for example, can be tethered to the remainder of the system that is underwater by an appropriate communication connection such as a wire or fiber. The transmitter can be located on an appropriate platform that is floating on the surface of the water or that is supported by the floor of the water body, such as the ocean floor.

The Fiber Topology

Figure 2:
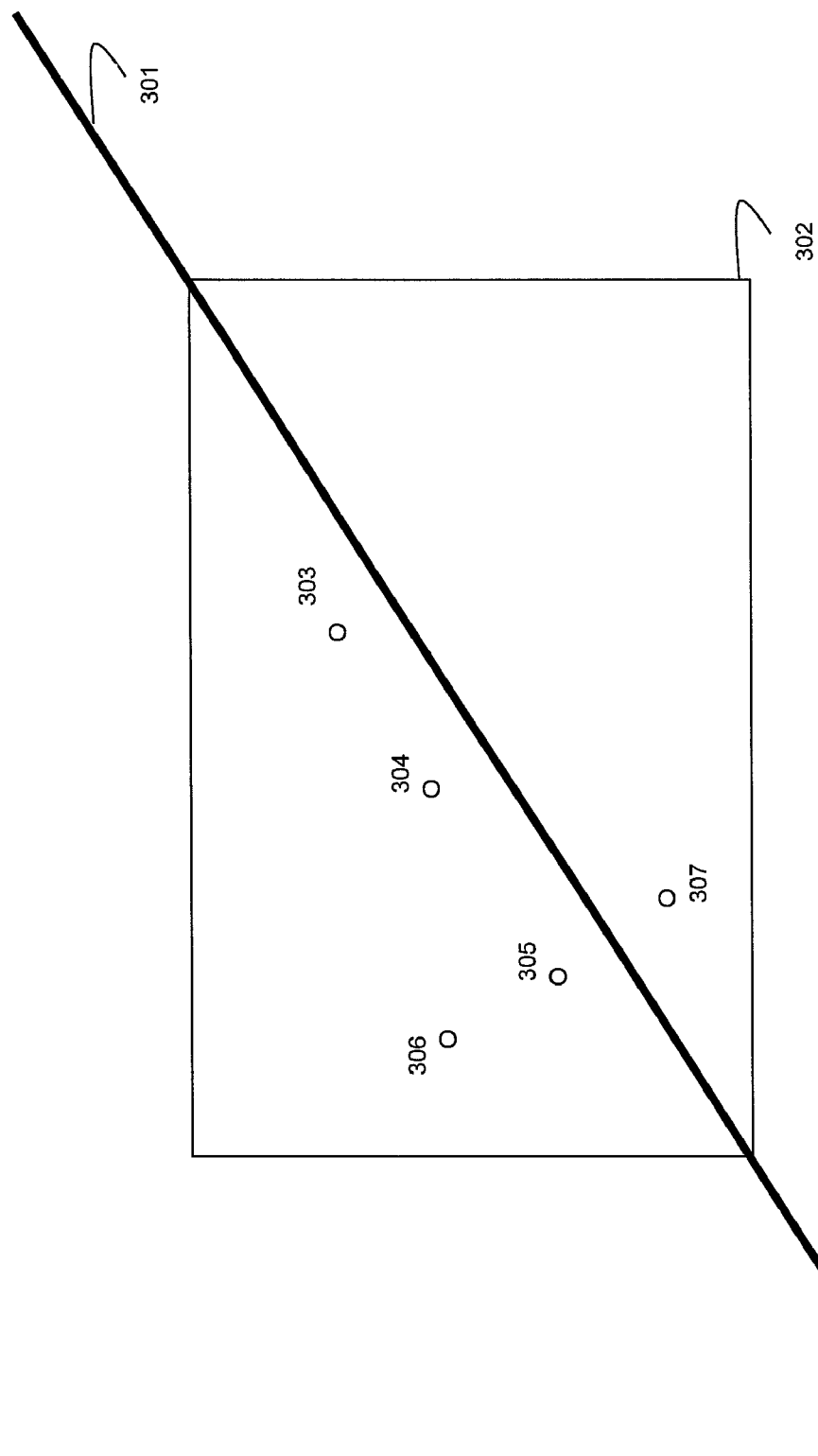
FIG. 2 is a schematic representation of a fiber topology involved in the disclosed technology.

FIG. 2 is a schematic representation of a fiber that may be deployed in accordance with the present technology over a two dimensional area 302. In the FIG. 301 is a fiber. It will be understood that for simplicity the instrumentalities shown in FIG. 1 are not shown in this FIGURE although they are present. 303 through 307 are disturbances that are monitored by the fiber surveillance system. 303 through 307 are, for example, acoustic disturbances that can be detected by the fiber surveillance system. These signals can be in the frequency range of between 20 Hz or 50 Hz on the low frequency side, and 20,000 Hz, 50,000 Hz or 100,000 Hz on the high frequency side. This fiber topology is linear and one dimensional, and since most fiber surveillance systems locate a disturbance by its lateral distance along the fiber, the location of the disturbances identified as 303 through 305 can be identified and distinguished because they occur at different lateral distances along the fiber. However, the location of the disturbances 305 through 307 can not be easily distinguished because they are located at the same lateral distance along the fiber, even though they are displaced perpendicularly from the fiber by different distances. Nevertheless, the locations of disturbance 305 through 307 can be distinguished using a two dimensional, overlapping topology, as discussed in greater detail below in the context of FIG. 3.

Figure 3:
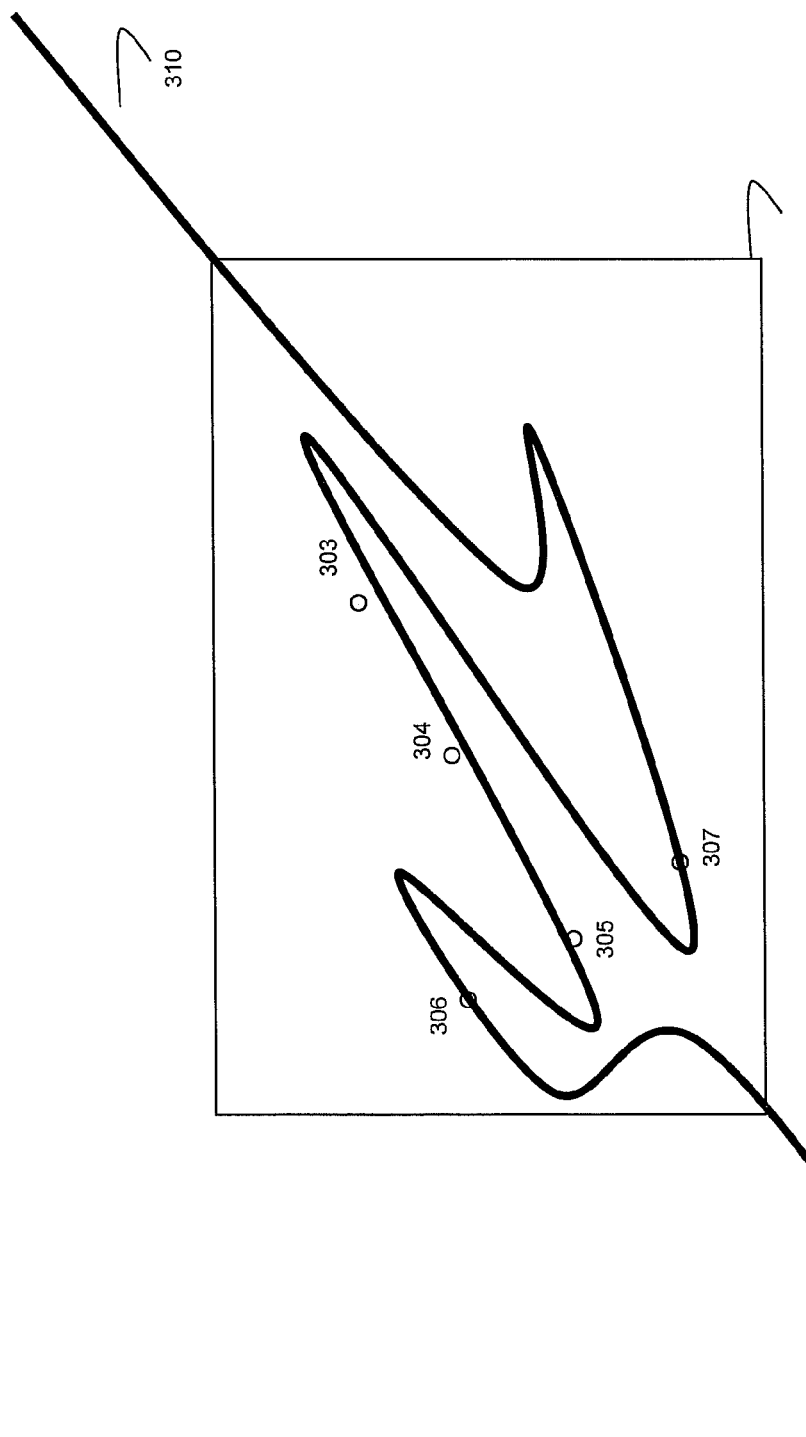
FIG. 3 is schematic representation of an alternative fiber topology involved in the disclosed technology.

In the embodiment of FIG. 3, the fiber 310 is shown as having a two dimensional topology, rather than the one dimensional, linear topology of the fiber shown in FIG. 2. In this FIG. 3 items from FIG. 2 are reproduced with the same numbers. In FIG. 3 the fiber meanders or serpentines over a two dimensional surface. Accordingly, in this FIG. 3, even sources 305-307 occur at different distances along the fiber and, therefore, their spatial location can be resolved with much greater accuracy than with the topology shown in FIG. 2.

It will be noted that in the two dimensional topology of FIG. 3 there is greater fiber coverage in a given rectangular area than when the fiber is oriented in single dimensional topology of FIG. 2, i.e. In FIG. 3 there is more fiber in the given area 302 than in FIG. 2. It will be understood that in the single dimensional topology of FIG. 2, the greatest length of fiber that can be oriented in the rectangular area 302 is equal to the largest diagonal associated with the area, as in fact is the case in FIG. 2. However, in the two dimensional fiber topology of FIG. 3, a greater length of fiber can be placed in the same rectangular area. Accordingly, in one embodiment of the disclosed, two dimensional topology, the length of fiber oriented in a given rectangular area is greater than the largest diagonal associated with the given area. In alternative embodiments, the length of fiber oriented in a given rectangular area is 10%, 20% or 50% greater than the largest diagonal associated with the rectangular area.

Figure 4:
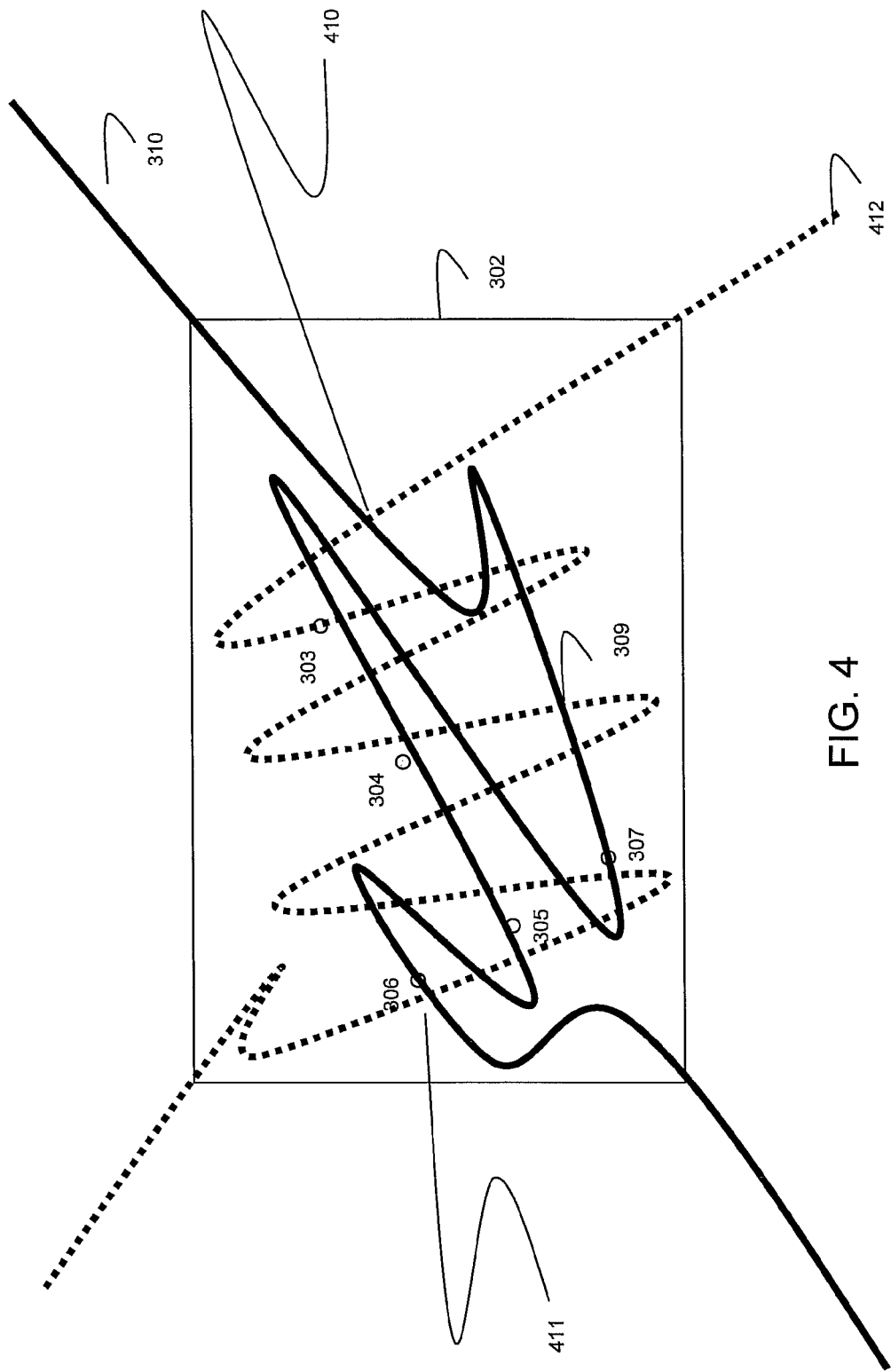
FIG. 4 is schematic representation of yet another alternative fiber topology involved in the disclosed technology.

Another embodiment of the invention is shown in FIG. 4. In this FIG. 4 items from FIG. 3 are reproduced with the same identifying numbers. In this FIGURE there are two fibers, 310 and 412, each of which is oriented in a two dimensional topology with the two fibers at least partially overlapping each other, with sections oriented approximately perpendicularly to each other. Each of these fibers may have its own source of optical energy, detector and associated instrumentation as shown for example in FIG. 1. Alternatively there may be one set of instrumentation which services both fibers.

In FIG. 4, 410 is one of the points where the two fibers overlap. In alternative embodiments the fibers overlap at more than 1, 2, 4, 10 or more points. It will be understood that the dual fiber topology of FIG. 4 will enable the determination of the spatial location of the various disturbances with much greater resolution because of the two dimensional nature of the topology of each fiber and the overlapping and approximately perpendicular nature of the orientation of the fibers. However it will be understood by persons having ordinary skill in the art that the degree and angle of overlap can vary over a wide range of values.

In FIG. 4, fiber 401 has overlapping points between 410 and 411. The lengths of the fibers from 410 to 411 are the portions of the fiber having overlapping points. That portion is greater, for example, than 10% of the total fiber length. It will be understood that in FIG. 4 any degree of overlap will result in a resolution improvement. However in alternative embodiments, portions of more than 10% 20% or 50% of the fiber length will have overlapping points. Similarly the angle between the fibers at a point of overlap can have a value of between 30 and 90 degrees. While this discussion has been in terms of two fibers, it will be understood that any number of fibers may be used to further improve the resolution of the system.

As discussed above, many fiber surveillance technologies determine the location of the disturbance based only on the distance along the fiber of the detected disturbance. This determination is most often made by measuring signal strength as a function of distance along the fiber, as measured for example by delay between the time that the source optical signal is injected into the fiber and the time that the reflected signal is detected. However, when the orientation of the fiber is two dimensional rather than one dimensional, the exact geographic location of any point along the fiber may not be known. Accordingly, the geographic location of a disturbance may not be determinable simply based on the distance along the fiber where the disturbance is located. Therefore, it would be advantageous to know the geographic location of points along the fiber as a function of its distance of the points along the fiber. The geographic location of points along the fiber can be determined by imposing a vibration or other acoustic signal at known points along the fiber. In this way the geographic location of the fiber can be mapped and the distance along the fiber can be associated with a specific geographic location. Such characterization of the fiber location can be accomplished by using, for example, well known crystal controlled vibrating rods. As the rod is moved relative to the fiber, both along the fiber and perpendicular to it, the signal will be maximum when the rod is exactly over the fiber. In this way the fiber may be calibrated to determine the exact geographic location of any point along the fiber.

In accordance with the disclosed technology, not only can the location of a disturbance be determined, but if the source of the disturbance moves, its location can be determined at different times. Accordingly the path of travel and the velocity of motion, as well as other characteristics of the motion, can be determined. In alternative embodiments of the invention, this information can be used to provide advanced warning not only of unauthorized activity, but of impending collisions between moving objects or between a moving a stationary objects.

Figure 5:
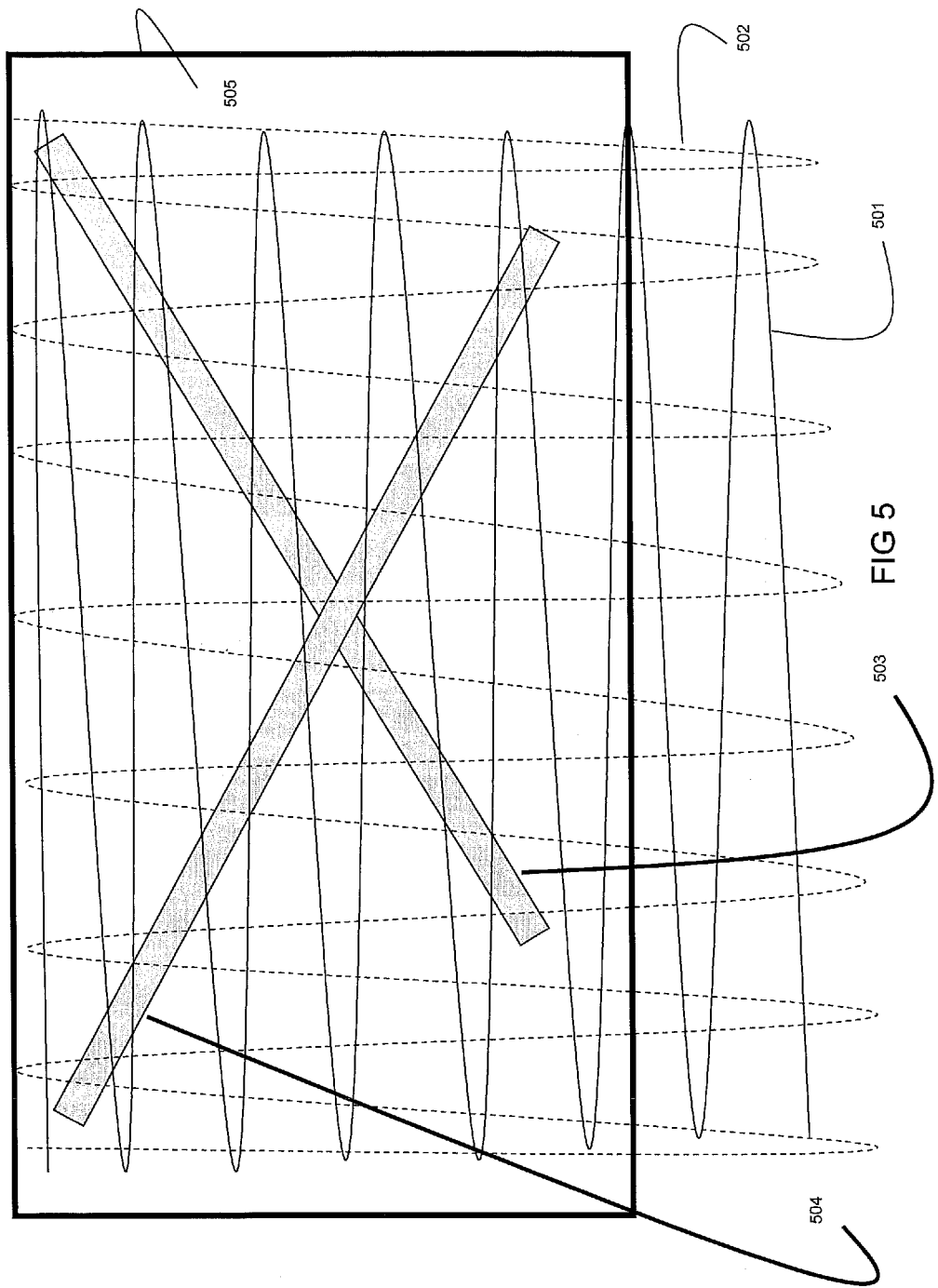
FIG. 5 is a schematic representation of an application of the disclosed technology.

The optical signals generated by different disturbances will have characteristics unique to the particular disturbance. For example the optical signal will be a function of the weight of the source of the disturbance as well as any motion associated with the disturbance. Similarly, any acoustic output associated with the source will also affect the signal. For example, there will a unique signal associated with stroke of swimmers. Additionally, noise associated with the continuous operation, starting, or stopping of an engine, with diving or swimming equipment such as moving flippers or breathing equipment, with waves lapping against a boat, with noise associated with ocean wave action, or with movements associated with ground or underwater erosion, or even a tsunami event, all will have unique signatures. In structures, the motions associated with stresses can be monitored over time and signatures associated with safe as opposed to dangerous levels of stress or material fatigue can be collected. These signatures can be based on acoustic frequency, phase and/or strength parameters. Such known signatures can be measured and stored, and then compared with the signal from an unknown source to determine the nature of the unknown source. Such analysis can be accomplished using for example well known digital signal processing techniques. These techniques can be combined with the increased spatial resolution enabled by the disclosed fiber topology to yield a much more effective and powerful surveillance methodology Applications of the Disclosed Technology The disclosed technology can be used in, for example, surface, subterranean and underwater applications. FIG. 5 is a schematic diagram of a generic embodiment of the disclosed technology. In this figure, the lines 501 and 502 are two overlapping fibers arranged in a two dimensional topology in accordance with the disclosed technology. The fibers will have associated instrumentalities for injecting optical signals into the fibers and detecting return signals that are characterized depending on the type of optical scattering technology being used such as Rayleigh scattering or ODTR. In this FIGS. 503 and 504 are paths along which vehicular or human traffic may pass. Accordingly, 503 and 504 may be runways or taxiways at an airport, railroad tracks, highways, or subterranean passages, such as in mines, or even traffic routes in a body of water. Based on the disclosed technology, traffic on the paths 503 and 504 may be detected with increased spatial resolution. Accordingly, such traffic may be guided by, for example, airport or railroad controllers to monitor traffic, direct traffic and/or avoid collisions between vehicles or between a vehicle and a stationary object. For example, the technology may be used to avoid collisions between planes on taxiways, boats in fog, or boats and bridges or other stationary objects. In the subterranean application, the technology may also be used to determine the location of trapped miners. As discussed below, the disclosed technology may be used to determine direction of travel of the source of the signal as well as velocity and acceleration of the source. Additionally the nature of the source may be determined by comparing the signature of the detected signal with a stored database of known signals. The traffic location and motion parameters may be displayed on a screen to produce a visible representation of the traffic for further ease of control. When used at airport locations, the detection capability may be extended to include airplane approach areas where, even though the plane has not landed, the engines provide sufficient acoustic energy to be detected by underground or surface fiber deployed in accordance with the disclosed technology. As disclosed the fiber surveillance system of the disclosed technology may be calibrated using an appropriate source or sources of acoustic energy In FIG. 5, 505 represents a perimeter of the area. The surveillance system may be used to determine unauthorized movement inside the perimeter, outside the perimeter, or from outside the perimeter to inside the perimeter. This technology may be used to establish security perimeters around structures or designated land or water areas, such as coastal areas and critical water based structures such as off-shore oil drilling facilities, nuclear power plants, etc. When applied in bodies of water the disclosed technology can be used to detect tsunamis, fish migration and other water based events that have acoustic or vibration signals associated with them. Both on-water and underwater activity can be detected.

Figure 6:
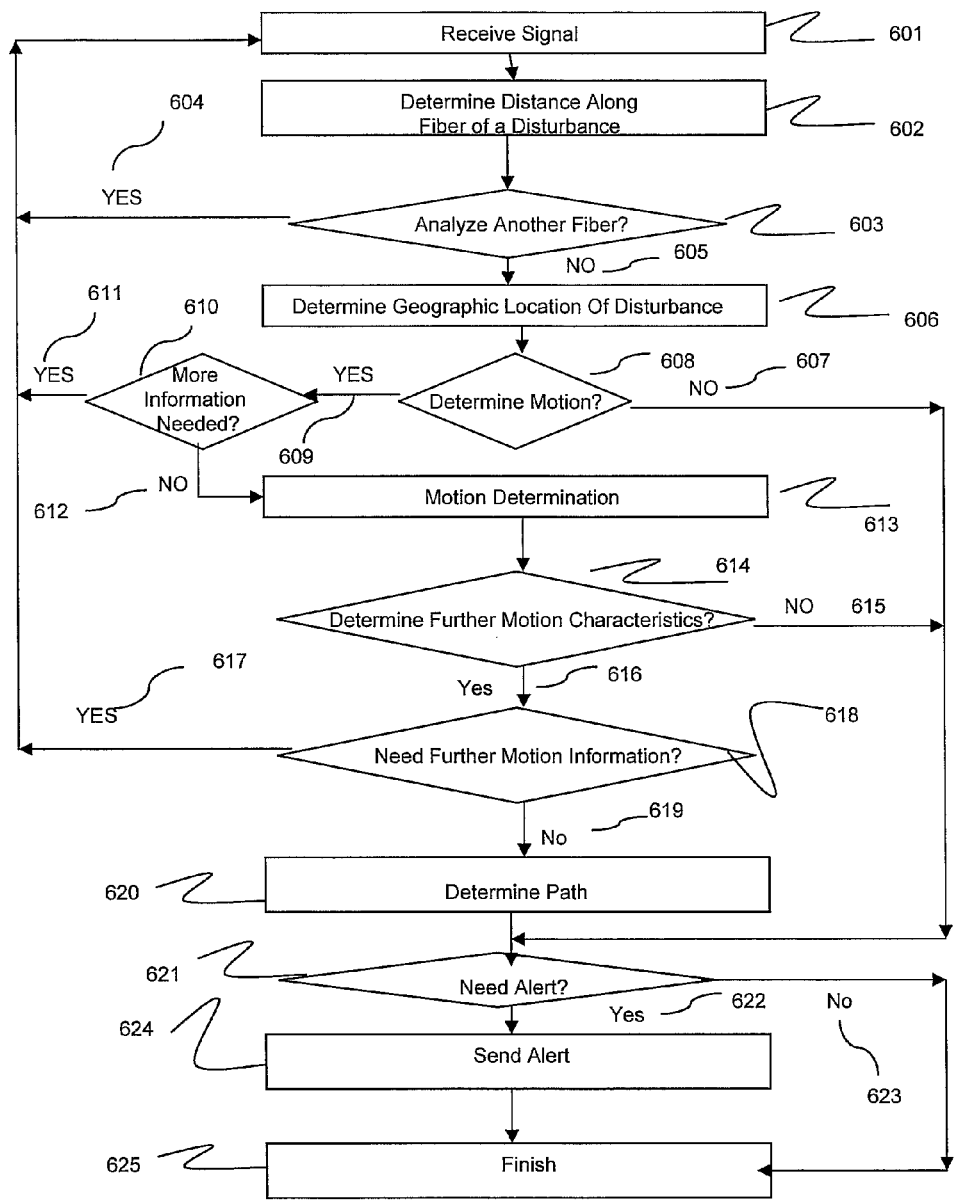
FIG. 6 is a schematic representation of an exemplary methodology used in one embodiment of the disclosed technology.

A generic methodology for use with the disclosed technology is shown in FIG. 6. In this Figure, at 601 a return signal is received from a fiber that is positioned in accordance with the disclosed technology. The return signal may be associated with on any appropriate fiber surveillance scattering technology, such as Raleigh scattering or OTDR. At 602, the location, along the fiber, of the disturbance associated with the return signal, is determined, perhaps based on previous calibration using known vibration sources. At 603 it is determined if there is another fiber associated with the surveillance system. If there is such other fiber, the method continues at 604, and a signal associated with the second fiber is received at 601 and the location, along the second fiber, of the disturbance associated with the second return signal is determined at 602. This loop continues until all fibers in the system have been monitored. Of course, it will be understood that, in alternative embodiments, the method need not analyze the return signal from every fiber in the system. In any event, at 605 if no further fibers are to be monitored for received signals the method proceeds to 606 where the various locations along the fiber that have been determined at 602 are correlated with each other, and perhaps with calibration information discussed above, to determine the geographic location of the disturbance.

At 608 it is determined if motion characteristics of the disturbance are desired. If at 609 such motion characteristics are desired, then at 610 it is determined if more information is needed to determine such motion characteristics. If more information is needed then at 611 the analysis loop is repeated and the various measurements are made again at a second time. This loop is repeated until at 612 it is determined that no further information is needed for motion analysis. The motion characteristics of the disturbance are then determined at 613 based on the measurements associated with the different times. If motion characteristics of the disturbance are not necessary, then the method proceeds at 607.

At 614 it is determined if further motion characteristics of the disturbance, such as the path, are desired. If such characteristics are not desired then the methodology proceeds at 615. If at 616 it is determined that further motion characteristics of the disturbance, such as the path, are desired then at if 618 it is determined if further information, such as the location of the disturbance at a third time, is necessary to obtain such further motion characteristics. If at 619 no further measurements are necessary then the methodology proceeds to 619. If at 617 such further information is needed, then, the methodology proceeds to obtain more information, for example, at different times, until at 619 no further measurements are necessary. At 620 further motion characteristics, such as the path of the disturbance are then determined.

If at 607 it is determined that motion characteristics are not desired, or if at 616 it is determined that no further motion characteristics are desired, then it is determined at 621 if an alert is necessary, for example, based on the location, motion or path data, because of, for example, unauthorized or suspicious activity, or an impending collision. If at 623 it is determined that an alert is not necessary then the method proceeds to a finish at 620. However, if at 622 it is determined that an alert is necessary, then at 624 an alert, and/or any further appropriate action is performed or initiated and the process finishes at 625. The alert may, for example, take the form of a communication to appropriate authorities or can be a local visual or audible alert.

Figure 7:
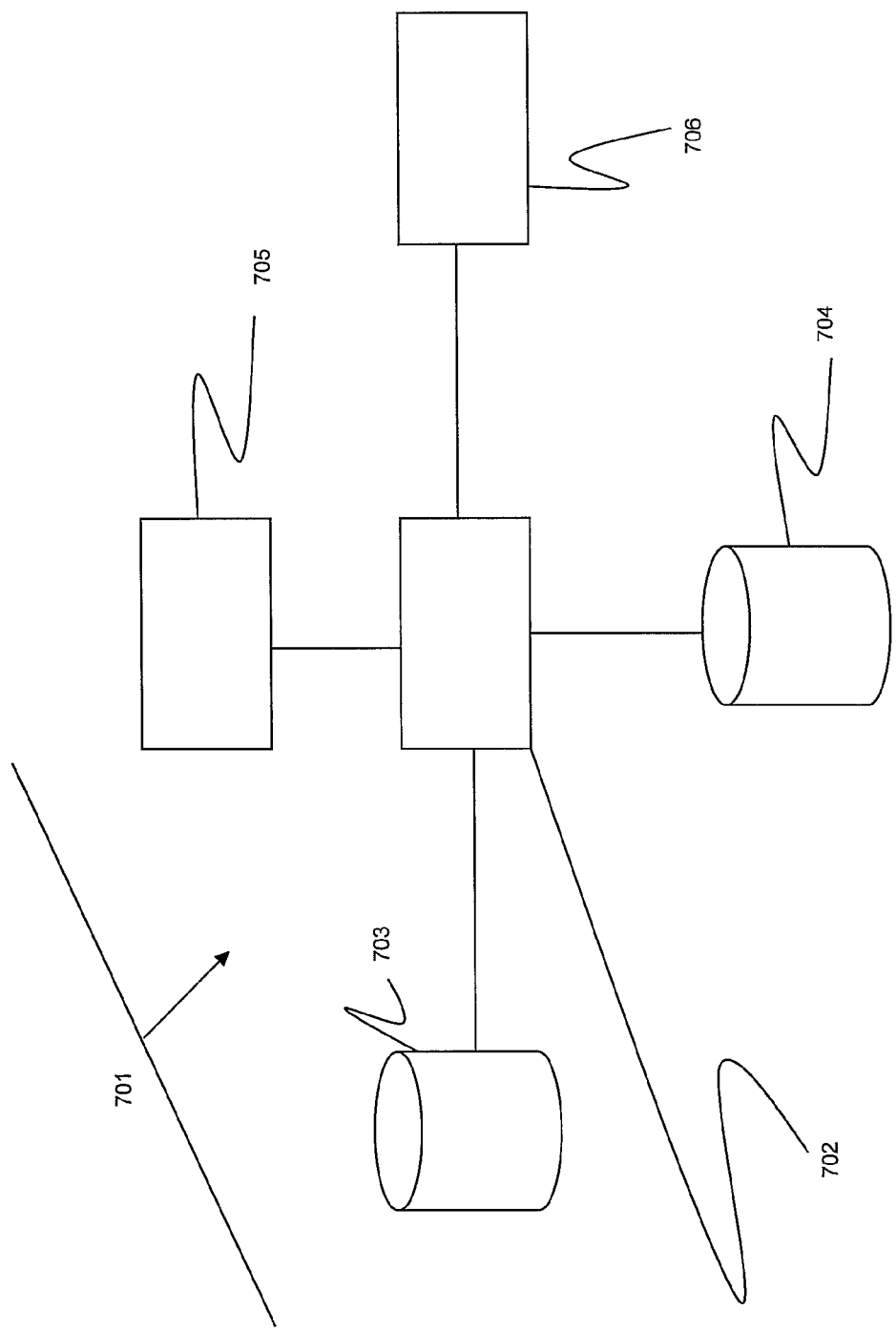
FIG. 7 is a schematic representation of a computer that may be used in implementing methodologies of the disclosed technology.
Figure 8:
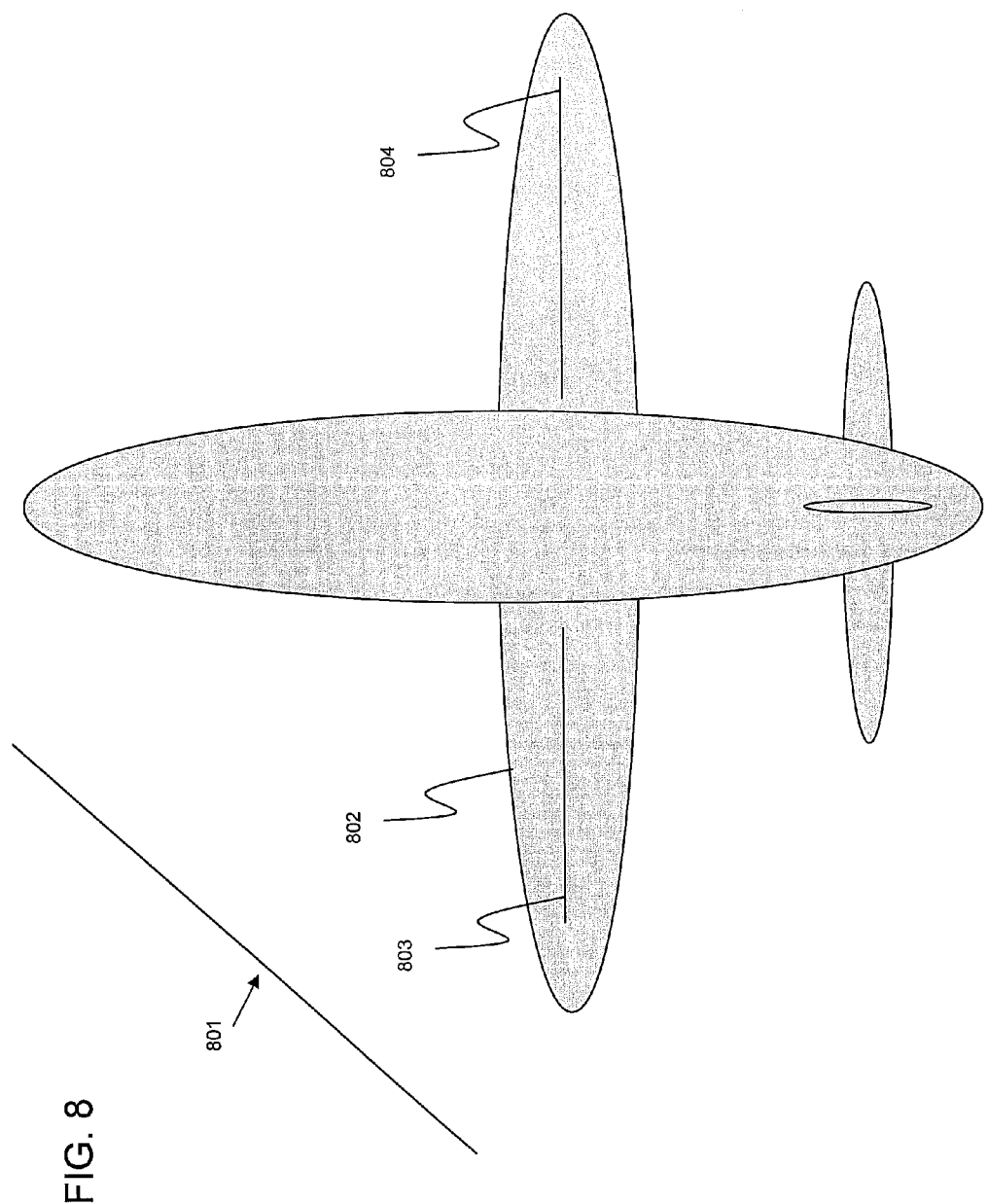
FIG. 8 is a schematic representation of another application of the disclosed technology.

A high-level block diagram of a computer that may be used to implement the methodology of FIG. 6 is illustrated in FIG. 7. Computer 701 contains a processor 702 which controls the overall operation of the computer 701 by executing computer program instructions which define such operation and implement the methodology of FIG. 6. The computer program instructions may be stored in a storage device 703, or other computer readable medium (e.g., magnetic disk, CD ROM, etc.), and loaded into memory 704 when execution of the computer program instructions is desired. Thus, the method steps of FIG. 6 can be defined by the computer program instructions stored in the memory 704 and/or storage 703 and controlled by the processor 702 executing the computer program instructions. For example, the computer program instructions can be implemented as computer executable code programmed by one skilled in the art to perform an algorithm defined by the method steps of FIG. 6. Accordingly, by executing the computer program instructions, the processor 702 executes an algorithm defined by the method steps of FIG. 6. The computer 701 also includes one or more network interfaces 705 for communicating with other devices via a network. The computer 701 also includes input/output devices 706 (e.g., display, keyboard, mouse, speakers, buttons, etc.) that enable user interaction with the computer 701. One skilled in the art will recognize that an implementation of an actual computer could contain other components as well, and that FIG. 7 is a high level representation of some of the components of such a computer for illustrative purposes A Vehicular Embodiment FIG. 8 is an embodiment of the disclosed technology in which fibers 803 and 804 are disposed in the wing, 802 of an airplane 801. Each fiber will have the instrumentalities shown in FIG. 1. For example, each of the fibers has a means for injecting optical energy into the fiber, such as from an appropriate laser. Each fiber has a wireless transmitter and a return-signal detector and analyzer associated with it, as shown in FIG. 1. While FIG. 8 shows a different fiber system in each wing, it will be understood that one fiber system can extent through both wings. It will also be understood that fibers may be deployed in any section of the plane and the wing has only been used for ease of presentation. Although in this embodiment the fiber is deployed in a one dimensional linear topology, the fiber can be oriented in a two dimensional topology. In another alternative, the return signal my not be analyzed or may be only partially analyzed on board the plane. Any analysis that is required after transmission will be performed at the receiving end of the transmission. Depending on the particular optical surveillance technology that is used, the amplitude, phase, frequency distribution, time characteristics or other characteristics of the return signal may be measured. A storage medium may be included to store the return signal or the partially or completely analyzed return signal prior to and/or after wireless transmission to a wireless receiver.

The return signal may be characteristic of stresses on the wing, or of acoustic signals associated with, for example, the performance of the plane's engines or other aspects of the planes instrumentalities, such as the landing gear deployment. Historical signatures for all or some of these signals may be stored, and the return signal may be analyzed by comparison to these historic behaviors. In that connection, other relevant background information, such as time, temperature, pressure, etc., may be gathered using other sensors. Based on the analysis, including perhaps comparison with historical data, alerts may be send to ground monitors and/or the cockpit crew.

Data from the vehicle may be continuously transmitted. However, in "sometimes-on" embodiments, data, either in raw form or partially or totally analyzed, may be stored on the vehicle and transmitted to the receiver only at certain times, for example, in an airplane embodiment, when the plane is in the vicinity of the receiver, such as at an airport. Of course, if circumstances requiring immediate action are detected, alerts and/or associated information can be sent to the operating crew of the vehicle or to the receiver for immediate attention.

It will be clear to persons having ordinary skill in this art that the disclosed technology may be deployed on other vehicles, advantageously in those subject to catastrophic failures, such as trains, submarines, and other vehicles such as cars, buses and trucks.

Exemplary Optical Phenomenon for Use with the Presently Disclosed Technology

Technologies such as those disclosed in references discussed in the BACKGROUND section of this disclosure may be applied to the technology disclosed in this specification. Accordingly, some of the disclosure from those Publications will be quoted here to give this specification an exemplary context. However, it will understood by those having ordinary skill in the art that the technology disclosed in this specification can be implemented with any appropriate optical scattering technique, including but not limited to Raleigh scattering and OTDR.

The technology disclosed in the patent application Publications referenced above involve, in one embodiment, launching optical pulses into a buried optical fiber and detecting the signal backscattered by the fiber. The optical frequency of one pulse within a pair of pulses differs slightly from the optical frequency of the other pulse within the pair of pulses. This frequency difference (or separation) itself varies from one pair of pulses to the next. This variation in frequency difference results in a detected backscattered signal having a phase that is modulated by an acoustic signal in the vicinity of the fiber, allowing decoding of the disturbance with improved signal to noise ratio, reduced fading and a linear output. (In the present disclosed technology, as well as in the technology disclosed in the referenced patent Publications, the following definitions apply: The pulses may be considered as individual pulses, pairs of pulses or groups of pulses; The term "launching" includes introducing the pulse into the fiber or transmitting the pulse in the fiber; The term "optical" as used herein may refer to the region of the electromagnetic spectrum that is visible, generally considered to be between approximately 380 nm. and 760 nm. However, depending on the application, the term "optical" as used herein can extend into what is sometimes referred to as the infrared and ultraviolet range of the spectrum, for example from 200 nm. to 5,000 nm, or nm. to 100,000 nm. In any event, the term "optical" will apply to any frequency which is used to transmit data or voice in or through optical fibers; and While the discussion is in terms of an optical fiber, in alternative embodiments pulses outside the optical spectrum may be launched into any appropriate medium that will transmit the pulses.)

In a specific embodiment disclosed in those patent Publications, where the pulses are 20 meters wide, the frequency difference is on the order of 5 MHz and varies by about 5 MHz from one pulse pair to the next. In alternative embodiments the frequency difference can range from approximately 1 MHz. to approximately 5 MHz. For these parameters, each pulse pair results in independent scattering, yielding improved signal to noise ratio. These parameters also result in a relative phase shift of the interference between pulses within each pulse pair of the order of Pi, yielding reduced fading if multiple pulse pairs are used. (Note that it is possible to detect the scattering of each pulse pair from the same section of fiber to within the spatial width of the pulse.)

Both the amplitude and the phase of the beat signal are affected by acoustic disturbances that may be present in the vicinity of the fiber. In one embodiment, the amplitude and phase is extracted from the scattered signal using known complex demodulation techniques. Demodulation is performed at the known frequency difference between pulses in a pair. Such demodulation may be performed by multiplying the reflected signal at the difference frequency by the sine and cosine of the difference frequency. This results in both sinusoidal components and a DC component. For a specific embodiment, a low pass filter with cut-off frequency in the vicinity of 5 MHz isolates the DC component. (Note that if this low pass filter is too narrow it will blur the spatial resolution of the result and if it is too broad it will include the results from the next pair of pulses that may be separated by about 10 MHz. yielding a result that is not independent.) The DC component reflects the phase and amplitude of the scattered signal. Rectangular to polar conversion enables the independent determination of the phase and amplitude. The phase will drift relative to the local demodulating signal because of small, slow-varying, changes in environmental parameters. Accordingly, to remove this drift, a high pass filter is used on the phase signal after the rectangular to polar conversion. In this way only the acoustic signal is observed. Detection techniques that only measure the amplitude suffer from low signal to noise ratio, fading and nonlinearity. The present invention, by using pulse pairs with appropriate frequency spacing and by analyzing the phase of the scattered beat signal, results in improved signal to noise ratio, reduced fading and an output that is linear over a larger dynamic range.

The discussion to this point has focused on a single pulse pair that is transmitted through the fiber. If, for this single pulse pair, we want to look at every 20 meters of fiber, we sample accordingly in time, knowing the time of launch. In analyzing the results, N analysis "bins" may be used, one bin for each 20 meter section of fiber. When multiple pulse pairs are used at some pulse repetition rate then for each bin data will arrive at the pulse repetition rate. A filter is applied to limit the signal to the acoustic band of interest—usually between 1 Hz and 200 Hz for acoustic coupling through the ground. A low pulse repetition frequency limits the maximum acoustic frequency that can be detected without aliasing. A given frequency difference can not be reused in a second pulse pair until we have observed all of the backscattering from that frequency difference. Accordingly, a given frequency difference can not be reused until the round trip time within the cable passes. A 2.5 kHz pulse repetition rate is compatible with a cable length of about 25 miles.

There is still an amplitude variation in the observed signal and if the amplitude gets too low the signal to noise ratio is poor. In those circumstances, the low amplitude result may be disregarded or given low weight. Additionally, a phase unwrap algorithm may be used to obtain greater dynamic range. Because of the discontinuity in arctan as the phase exceeds the range −Pi to +Pi, it is advantageous to add the results at the discontinuity to remove that artifact. If there is no acoustic disturbance there is no change in the phase and amplitude. If there is an acoustic disturbance, it results in very small local changes in fiber length and a linear change in the phase reflecting linear strain in the fiber.

The duty cycle may be improved by launching pulse pairs with different frequency deltas for the various pulse pairs. In this way multiple pairs may be propagated in the fiber at one time and their signals can be differentiated by observing the appropriate deltas. The analysis for a second pulse pair is the same as that described above for the first pulse pair except that the demodulating frequency is the new delta. After the high pass filtered phase result is obtained, it is combined with the appropriate bin from the previous pulse—using a time shift reflecting the time difference between the first and second pulse pair. The resultant acoustic signals will add coherently—that is, if the acoustic signal is varying, the detected variation between the first and second pulse pairs will be in phase and add constructively resulting in improved signal to noise ratio. Additionally, if one of the results for the first pulse pair is faded or has low amplitude, the results for the second pulse pair is highly unlikely to show similar effects because of the pi shift in the deltas.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An optical fiber surveillance system, comprising:
a first optical fiber;
a source of optical energy configured to inject optical energy into the first optical fiber;
an optical detector configured to detect a return optical signal from the first optical fiber, the return optical signal associated with an acoustic signal impinging on the first optical fiber;
a wireless transmitter connected to the optical detector and configured to transmit signals representative of the return optical signal; and
a database comprising stored signals representative of previously collected return optical signals.

2. The system of claim 1 wherein the first optical fiber is oriented in a two dimensional topology.

3. The system of claim 1 further comprising a second fiber overlapping the first optical fiber.

4. The system of claim 1 wherein the first optical fiber is deployed in one of an airplane, bus, train, ship or submarine.

5. The system of claim 1 wherein the wireless transmitter is floating on a water surface.

6. The system of claim 4 further comprising a database of stored historical signals associated with the respective one of airplane, bus, train or submarine.

7. A method for determining the location of a source of acoustic energy comprising:
receiving, from a first optical fiber, a first return optical signal associated with the acoustic energy;
wirelessly transmitting signals representative of the first return optical signal; and
comparing the first return optical signal to a signal representative of a previously collected return optical signal.

8. The method of claim 7 wherein the first optical fiber is oriented in a two dimensional topology.

9. The method of claim 7 further comprising:
receiving, from a second optical fiber, a second return optical signal associated with the acoustic energy; and
wirelessly transmitting signals representative of the second return optical signal associated with the second optical fiber.

10. The method of claim 7 wherein the first optical fiber is deployed in one of an airplane, bus, train, ship or submarine.

11. The method of claim 7 wherein the wirelessly transmitted signals are transmitted wirelessly by a transmitter that is floating on a water surface.

12. The method of claim 10 wherein the signal representative of a previously collected return optical signal comprises a signal associated with the respective one of airplane, bus, train or submarine.

13. The method of claim 7 further comprising deploying the first optical fiber from an airplane.

14. The method of claim 13 wherein the first optical fiber comprises a source of optical energy, a detector of return signals and a wireless transmitter.

15. The method of claim 14 wherein the respective airplane is a drone.

16. The method of claim 15 wherein a plurality of optical fibers are deployed.

17. A wireless detector configured to receive signals from an optical fiber surveillance system, the wireless detector comprising:
a database comprising stored signals representative of previously collected signals from the optical fiber surveillance system.

18. The wireless detector of claim 17 in which the wireless detector receives signals from an optical fiber surveillance system comprising an optical fiber oriented in a two dimensional topology.

19. The optical fiber surveillance system of claim 1, further comprising:
a processor configured to compare the signals representative of the return optical signal to the signals representative of previously collected return optical signals.

20. The wireless detector of claim 17, further comprising:
a processor configured to compare the signals received from the optical fiber surveillance system to signals representative of previously collected optical signals.

* * * * *